May 4, 1943. H. C. CHRISTIANCE 2,318,291
CORN PICKER
Filed July 13, 1940 3 Sheets-Sheet 1
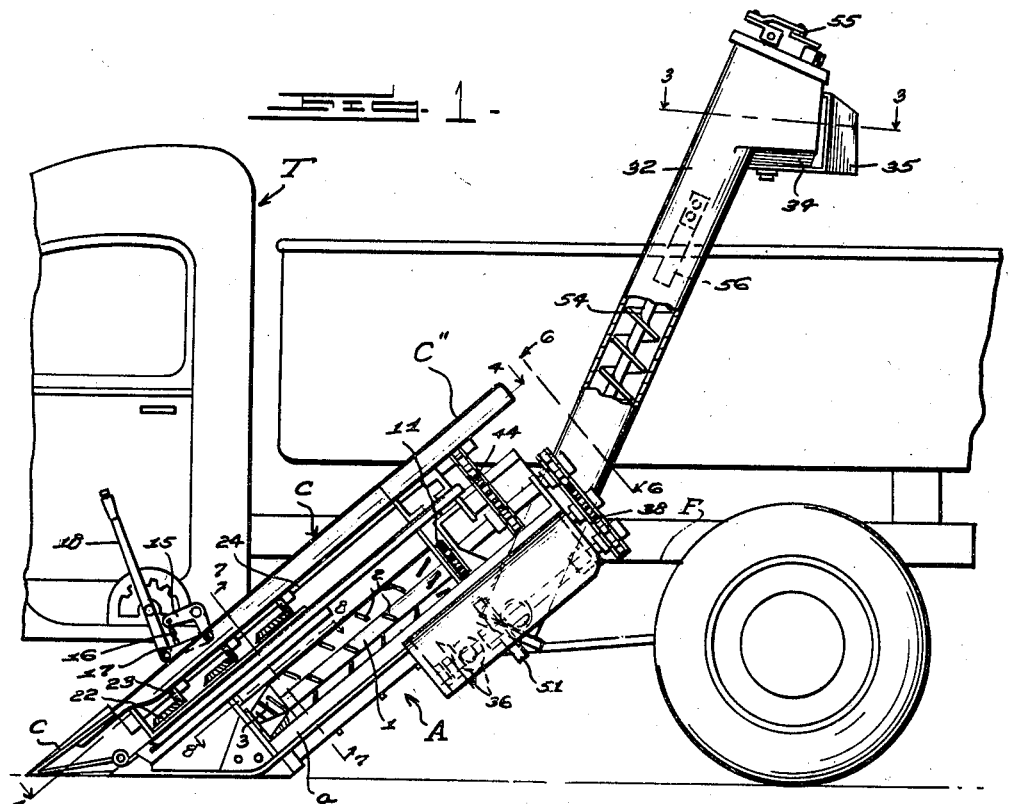
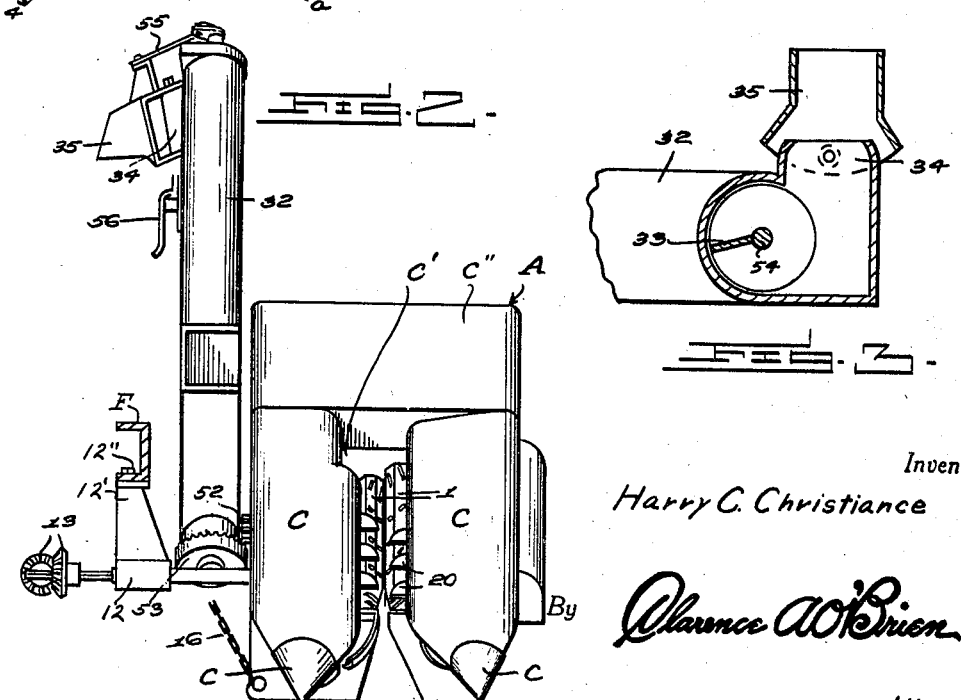
Inventor
Harry C. Christiance
By Clarence A. O'Brien
Attorneys May 4, 1943.   H. C. CHRISTIANCE   2,318,291
CORN PICKER
Filed July 13, 1940   3 Sheets-Sheet 2
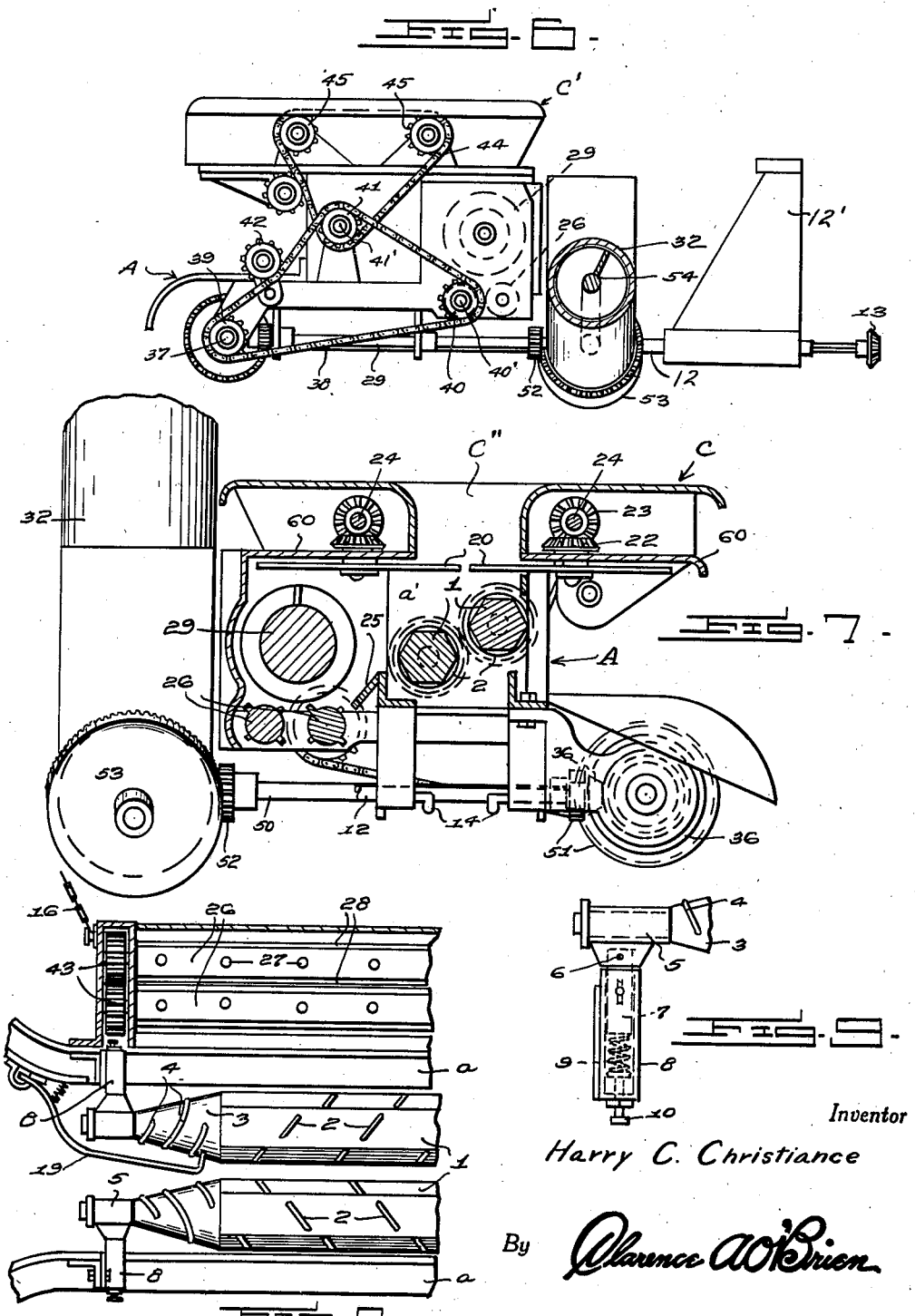
Inventor
Harry C. Christiance
By 
Attorney

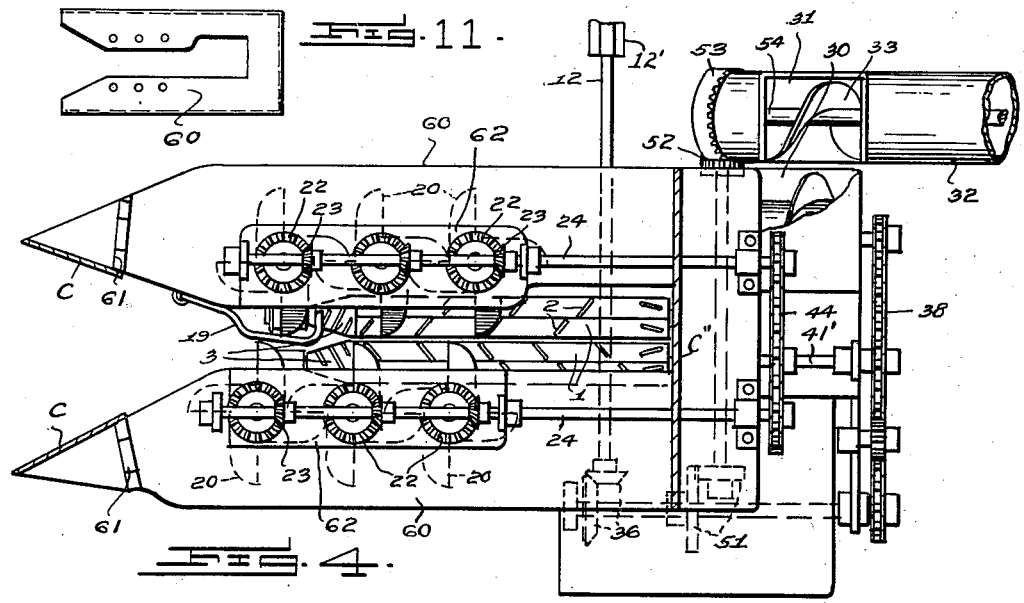
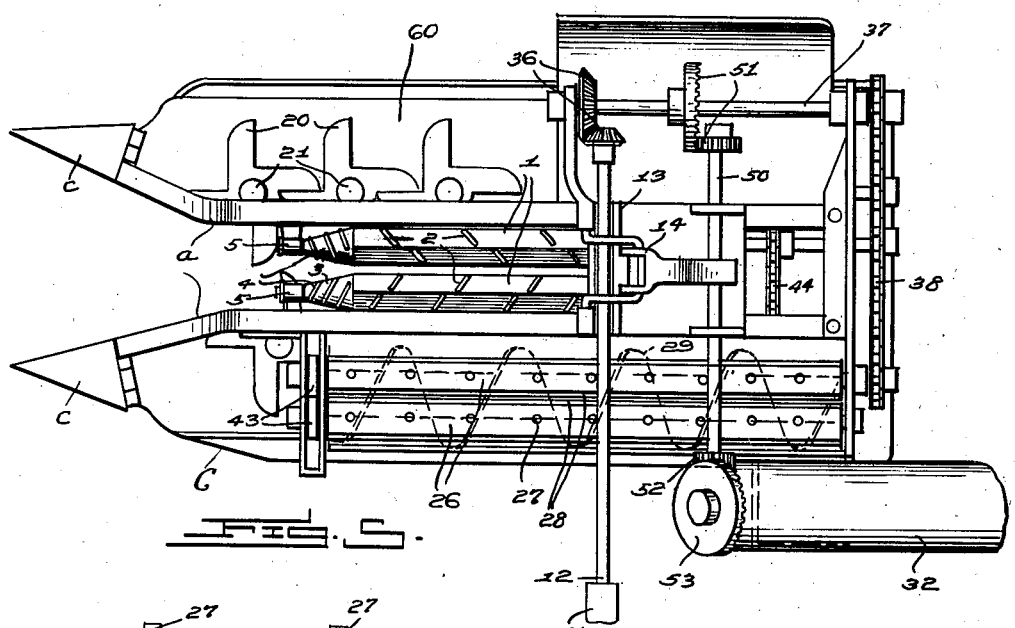
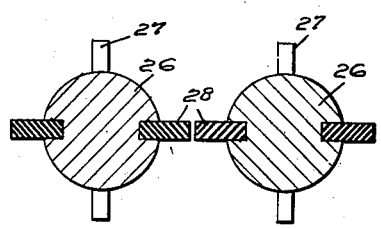

Patented May 4, 1943

2,318,291

UNITED STATES PATENT OFFICE 2,318,291

CORN PICKER

Harry C. Christiance, East Moline, Ill., assignor of one-half to Jerome Vogler, East Moline, Ill.

Application July 13, 1940, Serial No. 345,387

2 Claims. (Cl. 56—18)

This invention relates to corn pickers, the general object of the invention being to provide means whereby the picker can be attached to a truck or other vehicle at one side thereof, with means for snapping the ears from the stalks, husking the ears and delivering the husked ears into the body of the truck or vehicle.

Another object of the invention is to provide means for operating the picker from the power plant of the vehicle and also to provide means for distributing the ears evenly into all parts of the body of the truck or vehicle.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevational view of a truck and showing the picker apparatus connected therewith with parts of the apparatus being shown in section.

Figure 2 is a front view of the apparatus separated from the truck.

Figure 3 is a section on the line 3—3 of Figure 1.

Figure 4 is a section on the line 4—4 of Figure 1.

Figure 5 is a bottom plan view of the picker.

Figure 6 is a section on the line 6—6 of Figure 1.

Figure 7 is a section on the line 7—7 of Figure 1.

Figure 8 is a section on the line 8—8 of Figure 1.

Figure 9 is a view of the yieldable bearing means for the front end of a snapper roll.

Figure 10 is a transverse sectional view through the husking rolls.

Figure 11 is a detail plan view of the U-shaped plate forming part of the frame.

In these views the letter A indicates the frame of the apparatus which includes the bars *a* which are spaced apart to form a passage for the stalks and which have their front ends diverging and substantially horizontally arranged, the major portions of the bars sloping upwardly and rearwardly. A pair of snapping rolls 1 is supported in the frame and extends longitudinally in that part of the passage formed by the straight portions of the bars *a*. One of these rolls lies in a higher plane than the other roll, as shown more particularly in Figure 7 so that the ears of corn snapped off the stalks by the rolls will tend to pass off the lower roll. Each roll is formed with the transversely arranged ribs 2 and each roll is preferably of the six-sided type with a conical front end 3 which is also provided with spiral ribs 4. The front end of each roll is rotatably supported in a bearing member 5 which is fastened by a pin 6 to a block 7 supported for sliding movement in a housing 8, the housing being supported by a part of the frame and a spring 9 tends to force the block in a direction to push the conical end of the roll toward the other roll, the spring being adjustable by a bolt 10. Thus yieldable bearings are provided for the front ends of the rolls. The rear ends of the rolls are suitably journaled in a back part *a'* of the frame and the two rolls are geared together at the rear thereof as shown at 11 in Figure 1.

A shaft 12 is suitably supported from one of the channel frame members F of the truck T, in a conventional manner, such as by journaling the shaft in a bearing 12' secured to the channel member by bolts 12", the shaft being disposed transversely with respect to the truck and is driven from the power plant of the truck through means of the gears 13' and said shaft passes under a portion of the picker mechanism and through a bearing part 13, see Figures 5 and 6, transversely arranged in the frame of the picker and said shaft is held in said bearing part by the latch means 14. The picker mechanism is supported by the shaft and this shaft communicates the power from the power plant of the truck to the picker mechanism. A bellcrank 15 is pivoted to the truck and a chain 16 connects one end of the bellcrank to a part of the frame of the picker mechanism and a link 17 connects the other end of the bellcrank to a hand lever 18 on the truck. The shaft 12 and the bellcrank and chain support the picker mechanism at one side of the truck and in the position with the mechanism sloping downwardly and forwardly with its front end close to the ground so that it will pick up any stalks that have been blown down and the stalks will pass through the snapping rolls which are arranged in the mechanism in a forwardly and downwardly sloping position. By adjusting the lever 18 the front end of the picker mechanism can be raised and lowered to adjust it in relation to the ground.

Casing parts C cover the two parts of the frame at the front thereof and pointed parts *c* are hingedly connected to the front portions of the frame parts so that if they strike an obstruction they can swing upwardly and these parts serve to pick up stalks and guide them into the space between the two parts of the frame and then between the snapping rolls and a spring-pressed guiding strip 19 also acts to guide the stalks between the rolls and to prevent the stalks from dropping forwardly from between the rolls after they have entered the space between the rolls.

The stalks are also caused to pass between the snapping rolls by the pronged wheels 20, a row of which is placed in each frame part, and these wheels are carried by the shafts 21 journaled in the frame parts and they are so arranged that the prongs will extend into the space above the frame bars a and thus force the stalks between the rolls and keep the stalks moving through the space between the rolls as the machine travels along. Each shaft 21 has a beveled gear 22 on its upper end and these beveled gears are engaged by the pinions 23 on the shafts 24 journaled in the machine and extending rearwardly and driven as will be hereinafter described. The ears of corn snapped from the stalks by the rolls 1 and dropping over the lower roll 1 will slide down the incline 25 which directs the ears between the two husking rolls 26 journaled in the frame to one side of the rolls 1 and these husking rolls are provided with the pins or projections 27 and the strips 28 of rubber, the pins and strips being connected with the rolls in any suitable manner, such as that shown in Figure 10 or in any other suitable manner. These pins and the strips will act to remove the husks, silk and other matter from the ears of corn and such matter will drop upon the ground from between the rolls 26. A spiral conveyor 29 is placed above the two rolls 26 and the blade thereof tends to move the ears of corn upwardly as they are being engaged by the husking rolls 26, it being understod that these rolls 26 and the conveyor 29 slope downwardly and forwardly the same as the rest of the machine. As will be seen from Figure 5 the husking rolls 26 and the spiral roll 29 are longer than the snapping rolls 1 with the front portions of the husking rolls and spiral roll paralleling the snapping rolls. Adjacent the upper ends of the rolls 26 the conveyor forces the husked ears through an opening 30 and into an opening 31 of an elevator casing 32. A spiral conveyor 33 is arranged in the casing 32 which conveys the ears of corn upwardly through the elevator casing and through the discharge 34 thereof from which the ears of corn pass into the delivery chute 35. One of the casing parts C is formed with a recess C' at its rear end where any accumulation of ears of corn passing upwardly on the snapping rolls can pass through the recess upon the husking rolls though most of the ears will pass from the lower snapping roll down the incline 25 from the lower roll as soon as it is snapped from the stalk. The shaft 12 drives through the gears 36 a shaft 37 journaled in the frame of the picker mechanism and said shaft 37 drives a chain 38 by means of the sprocket 39 and said chain passes over the sprockets 40 and 41 and the chain tightener sprocket 42. The sprocket 40 is on a shaft 40' of one of the husking rolls and the front ends of these two rolls are geared together and to the front end of the spiral conveyor 29 by the gears 43, see Figure 8. The sprocket 41 is connected to one of the snapper roll shafts and this shaft 41' drives a chain 44 which pass over sprockets 45 on the shafts 24 which operate the pronged wheels 20.

A shaft 50 is journaled in the under part of the picker mechanism and gears 51 connect this shaft with the shaft 37 and a gear 52 on the shaft 50 meshes with a gear 53 connected to the shaft 54 of the elevator spiral to operate this conveyor.

A leverage arrangement 55 connects the upper end of the conveyor shaft 54 where it passes through the top of the elevator casing with the chute or spout 35 so that the spout is swung in an arc of a circle as the shaft 54 is being rotated and thus the ears of corn are delivered by the swinging spout evenly to all portions of the body of the truck.

A bracket 56 is fastened to an intermediate part of the elevator casing and it is adapted to hook over an upper edge portion of the truck body to hold the elevator in position alongside the body with the chute 35 in position to distribute the ears of corn into the body.

Thus it will be seen that as the truck travels along a field of corn the picker mechanism will snap ears of corn from the stalks and then the ears are delivered to the husking rolls where the husks, silk and the like are removed from the ears of corn and then the ears of corn are taken by the elevator and delivered into the truck body. The device is supported and driven from the truck and it can be easily taken from the truck when the truck is used for other purposes.

A U-shaped plate 60, see Figure 11, forms part of the frame of the mechanism and the pointed parts c are hinged to the front ends of this plate as shown at 61 and the front ends of the bars a are fastened to the plate and extend rearwardly therefrom, the major portion of the bars a sloping upwardly and rearwardly and parallel to the plate 60 which of course also slopes upwardly and rearwardly. Also, brackets 62 are connected with the top of the plate, one on each limb thereof and the shafts or pintles 21 for the pronged wheels 20 are journaled in the plate and these brackets also carry the bearings for the shafts 24 and the supporting means a' for the rear ends of the snapping rolls 1 depends from the rear of the plate. The casing parts C and C'' are carried by the plate and various other parts of the mechanism are supported from the plate. The plate is of sturdy construction and reinforced to strengthen the entire supporting parts for the mechanism of the picker.

While the drawings show the snapping rolls 1 of the six-sided type it will be understood that these rolls can have any suitable cross sectional shape such as five sides or seven side.

While the drawings show the picker connected with the left side of the truck it is to be understood that it can be connected with the right side if desired by changing the parts so that the picker will operate from the right side of the truck.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In combination with a vehicle, corn picker mechanism, including a frame sloping downwardly and forwardly, means including a drive shaft for pivotally supporting an intermediate part of the frame from a side portion of the vehicle, manually operated means, actuated from the vehicle, for raising and lowering the front end of the frame, means for driving the shaft from the power plant of the vehicle, snapper rolls in the picker mechanism, husking rolls in said mechanism, an elevator for receiving the ears of corn from the husking rolls and conveying them into the body of the vehicle and means for operating the parts of the picker mechanism and the elevator from the said shaft.

2. A corn picking apparatus comprising a downwardly and forwardly sloping frame, means for detachably and tiltably supporting an intermediate part of the frame from a vehicle at one side of the vehicle, such means including a shaft driven from a part of the vehicle, manual means, actuated from a part of the vehicle, for raising and lowering the front end of the frame, said frame including a reinforced U-shaped plate having its limbs extending forwardly with the inner edges of the end parts of the limbs diverging, a pair of spaced bars supported from the plate and having diverging front ends which are substantially horizontally arranged with the major portion of the bars extending upwardly and rearwardly, casing forming parts supported from the plate and located above the same, such parts including a rear transversely extending part and spaced forwardly extending parts, the latter parts being placed over the limbs of the plate and having the front ends diverging, pointed members forming the front ends of the spaced apart forwardly extending casing parts and hingedly connected to the front ends of the limbs of the plate, a pair of snapping rolls rotatably supported in the frame and above the space formed by the bars, a pair of husking rolls supported in the frame and having their front portions placed parallel to the snapping rolls with the rear portions extending beyond the rear ends of the snapping rolls, means for causing the ears of corn to pass from the snapping rolls upon the front parts of the husking rolls, conveying means above the husking rolls causing the ears of corn to pass upwardly and rearwardly over the husking rolls, an elevator at the rear of the apparatus for receiving ears of corn from the rear portions of the husking rolls and conveying the ears into the vehicle and means for actuating the two sets of rolls, the conveyor and the elevator from said shaft.

HARRY C. CHRISTIANCE.